INVENTOR
James A. Potter

United States Patent Office

3,259,821
Patented July 5, 1966

---

3,259,821
MEASURING SYSTEM
James A. Potter, 12 Green House Road,
West Hartford, Conn.
Original application Feb. 24, 1964, Ser. No. 346,630.
Divided and this application May 3, 1965, Ser. No. 465,225
1 Claim. (Cl. 318—28)

This application is a division of my application 346,630 filed February 24, 1964.

This invention relates to apparatus for and methods of measuring and to measuring systems. In some embodiments of my invention, combinations of signals representing variable quantities are originated and translated to provide a read out signal which can, if desired, express those quantities in numerical form. It also relates to controlling devices for accumulating, indicating, displaying, and printing numbers representing the measured values. The invention is especially adapted to servomechanism and follow-up devices used in combination with measuring transducers. The illustrative embodiment of the invention herein described in detail is a weighing mechanism, but my invention is susceptible to use in sensing and reading out measurements representing electrical, chemical, and mechanical quantities. The inventive concepts have general applicability to measuring systems, so that instrumentation engineers are taught the broader concepts by the disclosure of the weighing mechanism as an illustrative embodiment. The versatility and innate simplicity of my digital balancing and read out system is manifested for weighing scales by reason of its application in a single design rendition to three different kinds of weighing equipment, customarily designed as separate entities and constructed as separate facilities. The three kinds of weighing equipment to which I refer are: (1) indicating scales, which accept a single load at rest and give indication of the amount of the weight; (2) motion weighing scales, which give separate indicated amounts for weights of loads in motion across them in quick succession; and (3) bulk conveyor scales, in which the loads moving across the scale are weighed as a continuous stream, the weight of which is continuously integrated and indicated as an accumulated total. A single scale facility constructed in accordance with an illustrative embodiment of my invention suffices for these three kinds of weighing; and conversion from one mode of weighing to another is made by the operator simply by operating switches provided for the purpose.

A fundamental problem encountered in designing measuring systems with numerical read out is that the error signal whose magnitude and sense drive the servo follow-up devices must, in usual systems, be driven toward zero to the extent that the error signal at the time of read out is a negligible amount. This has resulted in the familiar problems of stability and sluggishness of response with respect to fidelity of indication of the magnitudes being measured. My invention permits a substantial magnitude of error signal to persist without sacrificing sensitivity, and thus enhances stability and speed of response. As embodied in the illustrations given herein these features are made possible by my novel switch-actuator mechanism which simultaneously originates digital feed-back signals for balancing the error signal and digital signals for acceptance by other devices for indicating, accumulating, displaying and printing numbers for the values.

Another part of my invention is a simplified flexure member for use as a flexible force transmitting member in systems requiring the use of levers as devices for accurately transmitting and summing forces and moments. This flexure pivot is especially adapted to weighing scales to provide advantages over knife-edge bearings. Flexure pivots heretofore employed have been costly due to intricacies of lever support contours required to fasten them in place, and due also to the separate check members they required to prevent buckling when subjected to side thrusts or compressions. My flexure pivot is applicable to many varieties of weighing scale levers, but is especially beneficial when used in combination with other novel features disclosed herein. Heretofore many flexure pivots necessitated that the angular motion permitted by the flexing of the pivot be limited to a small amount, typically a fraction of one degree. However, the flexure pivots of my invention permit a range of deflection from zero to several degrees. Heretofore the stress in the flexible members design has been limited to either tension or compression; whereas my invention permits designs suitable for stresses of the flexible member in either tension or compression.

Weighing scales, whether or not they contain levers, are customarily classified in two generic categories:

(1) Gravity-balanced scales, which give indication of load weight by the number and position of counterpoise weights; and (2) Spring scales, which give indication of load weight by the amount of displacement of an indicator moved by the elastic change in a spring receiving force from the load. My invention applied to scales permits the simultaneous employment of both the gravity balance and spring flexure principles in such a manner that both principles account for substantial portions of load indication, so that it can be classified as an hybrid type between the two generic categories. A partial re-balancing is automatically attained by means of counterpoise weights; and the remaining forces due to the load become deflections the magnitude of which is measured and digitized for digital accumulation along with the digits representing counterpoise weights. An advantage of my hybrid weighing scale is that it permits stiffer flexure spring to be used as pivots, and so provides self-checking of the pivoted members against lateral movement, and thus eliminates the cost and complexity of separate members for side-checking.

In belt conveyor scales used heretofore an analog signal representing belt speed has been integrated with instantaneous weight signals; and the practical problems with the tachometric instruments so employed have limited accuracy and kept maintenance costs high. In its embodiment as a conveyor scale my invention does not use belt speed as an input, but rather uses signals representing belt displacement to initiate sequential read out intervals during which the weight at the scale section of the conveyor is digitally accumulated and indicated in remote devices.

It is usual in obtaining precision of indicated measurement that support members and auxiliary members such as bearings be of precision design and fabrication. It is also usual in such systems containing electrical elements that the components throughout the circuitry must be of precision quality. In my invention only a relatively few of the elements and members must be designed and manufactured with precision, while most of the components and parts can be fabricated by ordinary non-precise technique. Such minimizing of the number of precise components while achieving a precise measurement with predominantly standard hardware provides the basic present invention.

Some automatic indicating and measuring devices in common useage embody forms of differentiation between successive increments of changes in quantity measured which manifest a "critical position" between the steps representing two successive increments. This results in ambiguity of readout when certain critical elements become aged, worn or slightly out of adjustment. For example, a load on a scale actually weighing 499 pounds might manifest the fault of ambiguity by reading out 599 simply because the hundreds sensing device had selected "5" in error. Elaborate improvements have been devised to reduce the incidence of such erroneous readout. My invention eliminates the problem by its intrinsic nature. That is, I provide a separate digital signal for each component of the quantity being measured, and transmit each of the values separately to the remote accumulator without interference from the other values. I accomplish the insertion and withdrawal of each balancing value in a separate mechanism, and the same mechanism originates the signal representing the value.

In some currently acceptable automatic measuring systems, each measuring operation comprises a predetermined, definite number of internal cycles, so that there is no way of hastening the attainment of the readout when only a small change needs to be traversed from the preceding to the present reading. A further disadvantage of the definite number of internal cycles for each measurement is that a slight change in the measured quantity just prior to the end of the internal cycle invalidated the reading and requires the additional time of another complete cycle. My invention avoids these disadvantages by employing my least-next principle, whereby there is no predetermined definite internal cycling sequence; changes are made only in the lowest-valued rebalancing elements sufficient to progress toward the measured value.

An advantage of my measuring and readout system as illustrated herein for weighing scales is that it provides a separately insulated electrical readout circuit for each bit of data to be read out. This permits the remote accumulating, integrating and recording equipment to be of any available kind, provided only that it recognize contact closures as its sources of data. The remote equipment may provide its own power to actuate its own data input circuits, through the readout contacts in my switch-actuator.

Heretofore, measuring system designers have often used a plurality of null detectors and servomechanisms operating at the same time so as to change several orders of magnitude of feedback signal at the same time. In my invention the required speed of response is attained with a single null balance detector and a single servomechanism drive to change only one bit at a time. My system therefore reduces cost and complexity, for given criteria of performance.

The accompanying drawings disclose an illustrative embodiment clarifying the principles of my invention.

In FIGURE 1, each of the sequentially driven mechanisms is of a bi-stable kind, and each mechanism initiates an appropriate readout signal each time it changes stats to provide a rebalance signal.

Figure 2:
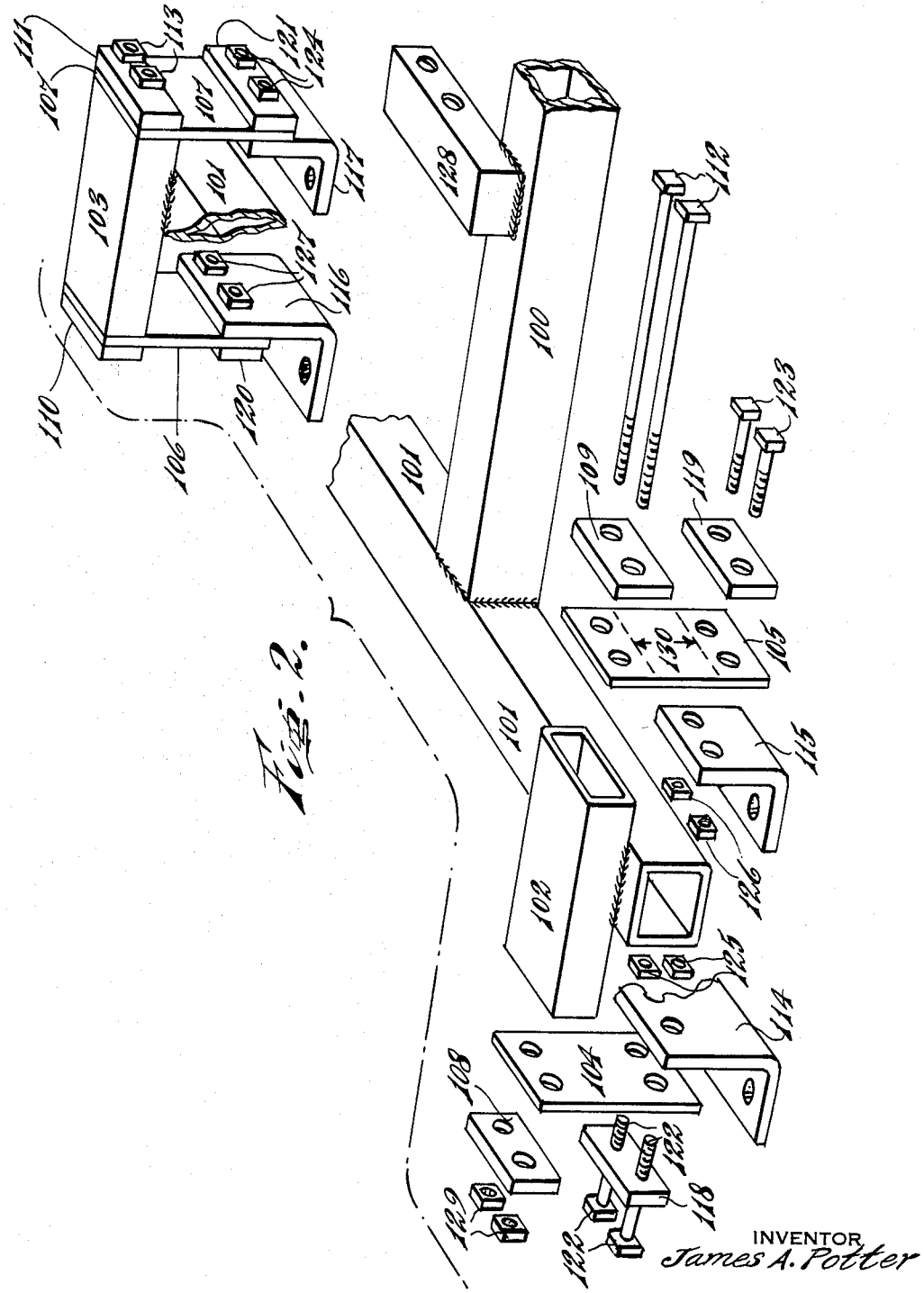
FIGURE 2 illustrates four of my flexible force transmitting pivots as applied to a scale lever assembly, and the view is partially exploded to more clearly portray the relative positions of the flexure members with their cooperating clamps and supports.
Figure 3:
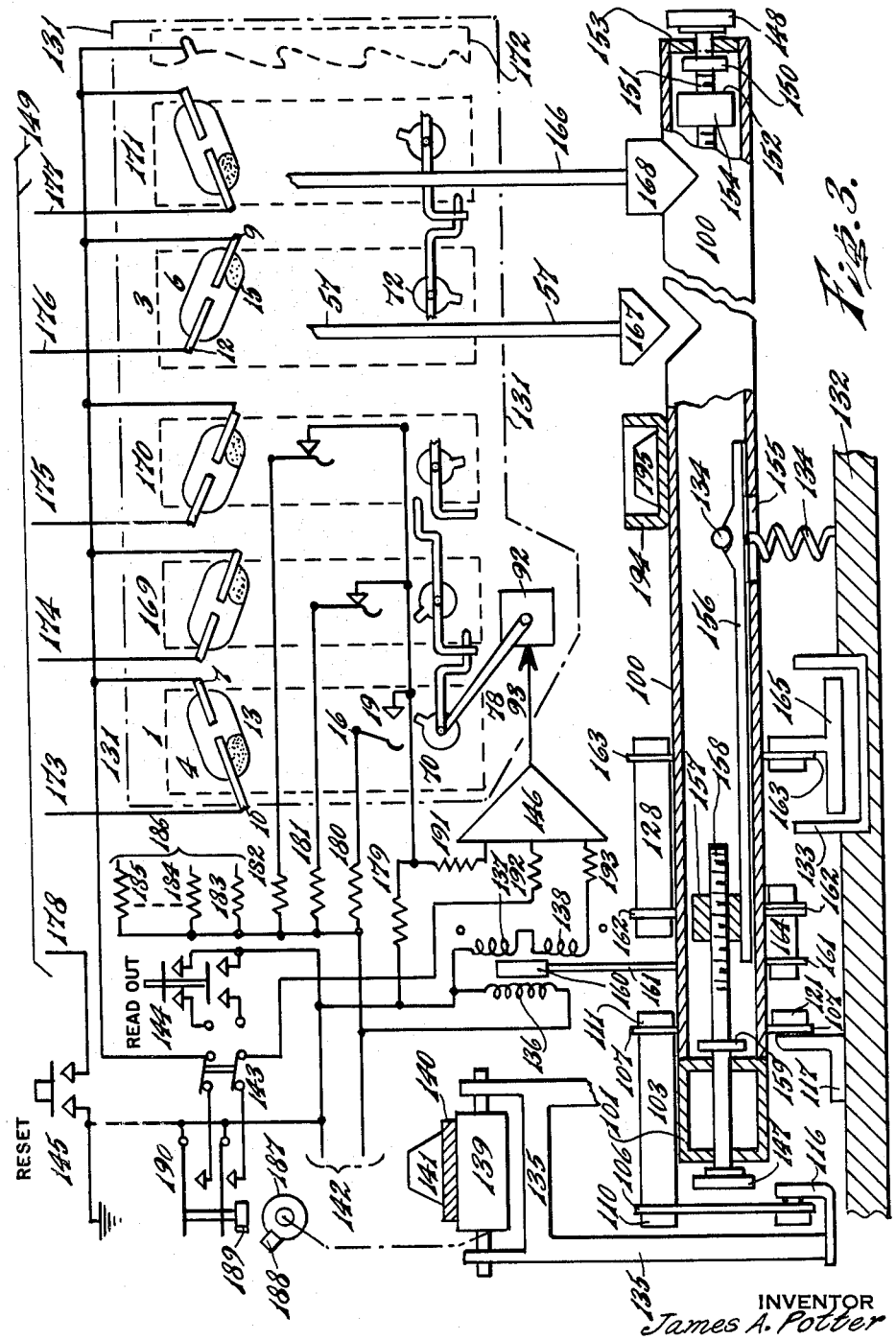

FIGURE 3 schematically represents one embodiment of a weighing scale system constructed in accordance with the principles of my invention. Portions of schematic representation of the switch-actuator of FIGURE 1; and portions of schematic representation of the lever assembly of FIGURE 2 are included within FIGURE 3, which also includes schematic representations of other elements and devices of such embodiment of a scale system.

Figure 1:
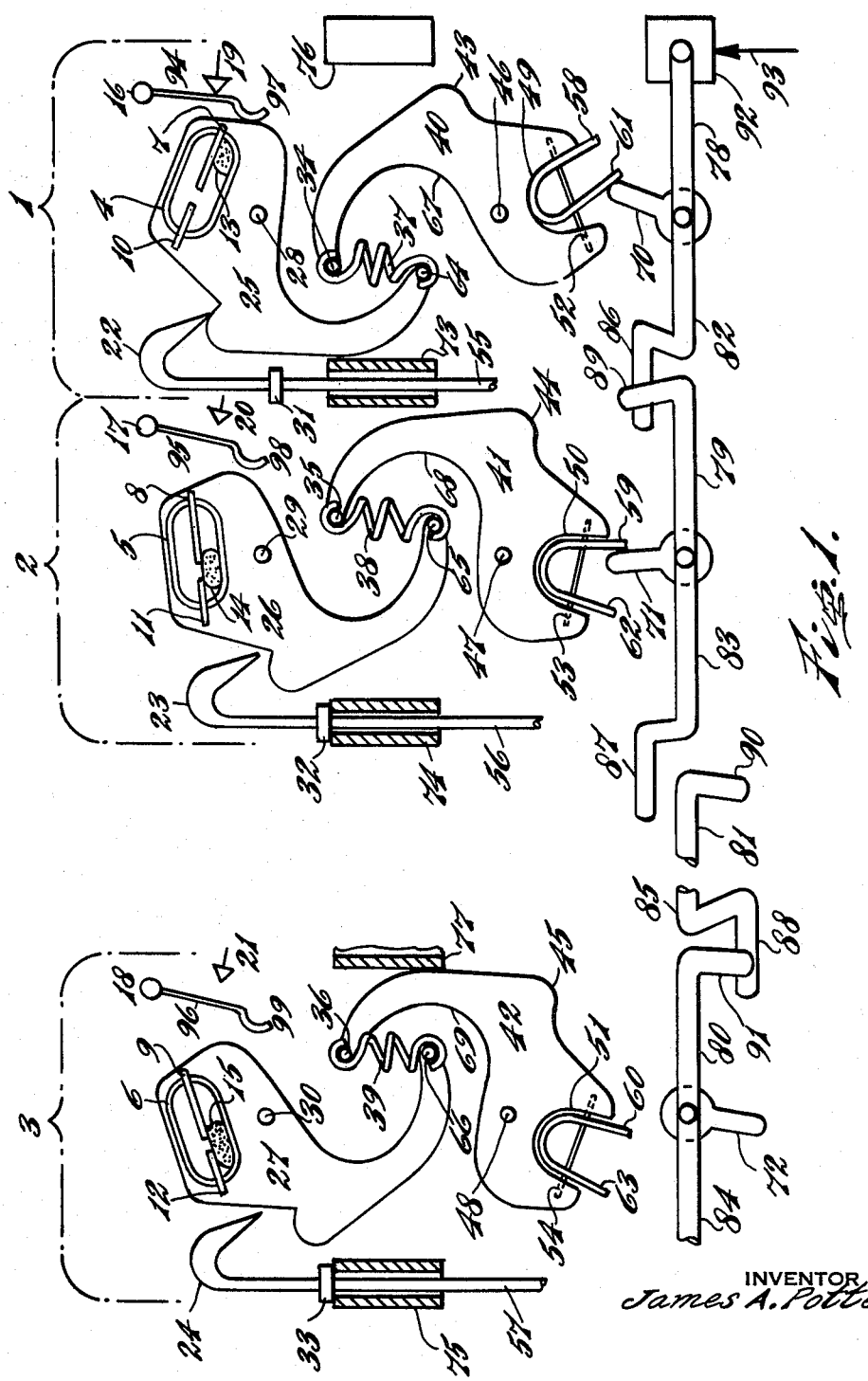
FIGURE 1 is a schematic representation of my motor-driven switch-actuator.

Referring now to FIGURE 1 for description of my switch-actuator, it is to be noted that the main support structure is not illustrated. Those skilled in the construction of switch activator mechanisms readily recognize that suitable means would be provided for supporting bearings, stops and framework in the rigid relative positions required for them to operate as described herein. As shown schematically in FIGURE 1, a motor 92 drives the first of a series of mechanism, each mechanism driving the next mechanism in the series. Mechanism 1 is driven directly by motor 92. Mechanism 1 drives mechanism 2. Mechanism 2 drives an intermediate mechanism not illustrated. Mechanism 3 is driven by another intermediate mechanism not illustrated. Mechanism 3 drives still another mechanism not shown. Intermediate mechanisms are mentioned in connection with FIGURE 1 to indicate that dozens of mechanism closely similar to mechanisms 1, 2, and 3 can be arranged as taught by my invention so that each in the series is driven by the next preceding mechanism, except that the first in the series is driven by the motor. Each such mechanism is associated with one bit of digital data corresponding to the quantity of rebalancing effect it contributes to the measuring arrangement. The following description pertains to mechanism 1; but it can be read as pertaining to mechanism 2 by transliteration of reference numerals to the next higher number; and it can be read for mechanism 3 by transliteration of each reference number to the second next higher number.

The operation of mechanism 1 in FIGURE 1 can be understood by noting that members 25 and 50 are free to rotate to a limited angular extent about their respective bearings 28 and 46. The two members are caused to move in cooperation by reason of tension spring 37, which exerts a continuous force urging pins 64 and 34 towards each other. Pins 64 and 34 are fastened to their respective carrying members 25 and 40. This interrelation between the spring 37 and members 25 and 40 exerts torques upon the rotary members 25 and 40 so that they seek to move toward one of the two limits of their respective ranges of rotation. FIGURE 1 illustrates stop 73 restraining member 25 from any further clockwise rotation, while spring 37 continues to exert a clockwise torque upon 25. This condition brings pin 64 to a fixed position with respect to the supporting structure so that member 40 will seek a position of rest without a separate stop to restrict its counter-clockwise motion. However, it is preferable to provide a separate stop, not illustrated, to establish a separate limit for the counter-clockwise rotation of member 40.

Member 25 has contours of its outer periphery such that it engages lifting hook 22 and finger 97 as it approaches the clockwise limit of its rotation. In the positions illustrated for mechanism 1, the member 25 has fully engaged lifting hook 22 so as to lift it upward and continue to support it in an elevated position, and has pushed finger 97 outward, to hold it in its outward position. Rod 55 is an extension of hook 22, and collar 31 is securely fastened to both of them, and this assembly is loosely fitted through a hole in stop 73 so as to slide freely up and down when picked up and dropped by the engagement and disengagement of the shoulder on member 25 with hook 22.

Contact spring 94, terminal 16, finger 97, and contact 19 comprise an electrical switch operated by the cam-like contour on the periphery of member 25; and the circuit between 16 and 19 is shown complete in mechanism 1 of FIGURE 1. Another electrical switching circuit in mechanism 1 is a mercury switch 13A composed of sealed enclosure 4, electrode 7, electrode 10, and mercury globule 13. The mercury switch 13A is secured to be carried in rotation by member 25 by means of fastening its sealed enclosure 4 to member 25. The mercury switch 13A is so oriented in its mounting upon member 25 that electrodes 7 and 10 are open-circuited in the clockwise position of rest for 25, as illustrated in mechanism 1 of FIGURE 1. Cam-like surface 43 on member 40 is provided to actuate additional switch fingers when they are required for auxiliary signals, but no such additional fingers nor switches are illustrated.

The lower extension of member 40 contains a slot 49 which is of suitable contour and dimensions to retain flat spring 58, 61. Pin 52 is also required to retain the spring 58, 61 in the required orientation in the mechanism. Pin 52 is secured at both ends to the member 40 at the sides of slot 49, and passed loosely through clearance holes in spring 58, 61.

In FIGURE 1, rotors 70, 71, and 72 are shown as capable of rotating in either a clockwise or a counterclockwise direction. The motor 92 can rotate in either a clockwise or counterclockwise direction or be motionless, depending upon the nature of the signal 93. It is important that it be recognized that FIGURE 1 schematically shows that when the signal 93 is making a correction, the signal 93 actuates the motor 92 to rotate at least one of a series of rotors such as rotors 70, 71, and 72 in either a clockwise or a counterclockwise direction. The shafts which drive rotors 70, 71, and 72 necessarily rotate in the corresponding clockwise direction, or counterclockwise directions, but in illustrating the backlash driving of the series of shafts in FIGURE 1, it is convenient to think of bevel gearing (not shown) between each of the rotors 70, 71, and 72 and motor 92 and the corresponding shafts. Thus, as signal 93 drives motor 92 clockwise to drive shaft 78 clockwise to drive 70 clockwise to drive shaft 82 clockwise to drive crank 86 clockwise to overcome the backlash to engage offset 89 to drive 79 clockwise to drive rotor 71 clockwise to drive shaft 83 and crank 87 clockwise, the series operation can be understood, notwithstanding the difficulty in illustrating all of the clockwise rotation while still clarifying the series operation and predetermined backlash of the corresponding series drive of rotor 71 in a counterclockwise direction by motor 92 when appropriately directed by signal 93.

Rotor 70 rotates in the same direction as its drive shaft 78, 82. Crank extension 86 has an axis parallel to the axis of rotation of shaft 82, and its axis of rotation is the same as that of shaft 82 because it is attached as a crank to it. Crank extension 86 is arranged to engage shaft offset 89, but a large amount of clearance of rotation is allowed between the two, so that there is exhibited a large amount of backlash between the two. The magnitude of backlash may be on the order of a few degrees to 359 degrees. Preferably backlash is of the order of 50 to 320 degrees. Bearings not shown for shaft 78, 82 are rigidly attached to the supporting framework and are so equipped as to restrict axial motion of the shaft so that rotor 70 will at all times be able to engage spring 58, 61 when rotated.

Bearing 28, bearing 46, stop 73, and spring-holding terminal 16 are rigidly attached to the support structure. The angular position which rotor 70 has attained at the moment illustrated in mechanism 1 of FIGURE 1 was attained in clockwise rotation. At the moment of the illustration, the end of rotor 70 is in the process of pushing aside spring end 61 in the course of its rotation. If shaft 78 is driven additional revolutions in the clockwise direction the tip of rotor will push aside spring tip 61 once during each revolution. As the tip of rotor 70 rotates in the clockwise direction beyond spring tip 61, the spring tip 61 springs back against the side of slot 49, and will then be in position for a driving engagement whenever rotor tip of 70 reverses to approach it in counterclockwise rotation. In the position illustrated in mechanism 1, spring tip 58 is in a position far enough from the center of rotor 70 so that the tip of rotor 70 clears it. This concludes the portion of the description in which the description for mechanism 1 can be transliterated into descriptions for mechanisms 2 and 3.

Energy path 93 is the only source of drive power for the switch-actuator assembly of FIGURE 1, and is so arranged that it can cause motor 92 to rotate shaft 78 either clockwise or counterclockwise, or to allow it to coast to a stop, in a manner similar to the operation of conventional servomechanism drives or the drives for follow-up systems. FIGURE 1 shows the switch actuator assembly during a moment of time when the motor 92 is driving rotor 70 in a clockwise direction; and, having taken up the backlash between crank extension 86 and shaft offset 89, drive torque is driving rotor 71 in clockwise rotation. The tip of rotor 71 has just engaged spring tip 59, and has started to drive member 41 in counterclockwise rotation. Member 41 has moved away from stop 73, and has caused member 26 to start rotating clockwise. A continuation of the driving forces will cause tension spring 38 and the associated pins 35 and 65 to move beyond their dead center, and the spring will cause member 26 to snap quickly against its stop 74, and mechanism 2 will have assumed the position of equilibrium illustrated in mechanism 1. After 41 has assumed the position shown for 40, continued clockwise drive of rotor 71 will cause repeated flexing of spring tip 62; but the continued rotation in the same direction will cause no further change in the state of equilibrium of mechanism 2. As clockwise rotation continues, the backlash between crank extension 87 and shaft offset 90 will be reduced until contact is made between the two of them and shaft 81 is driven in a clockwise direction. As clockwise drive continues, the backlash provided in each of the mechanisms intermediate between shafts 81 and 85 will be taken up, and rotor 72 will start to rotate clockwise. If rotation stops or reverses before the tip of rotor 72 engages spring tip 60, no disturbance of the condition of equilibrium illustrated for mechanism 3 will be imposed. If, however, the tip of rotor 72 is driven into spring tip 60 and continues its course, member 42 will be driven counterclockwise away from its position of rest against stop 77 into the unstable condition illustrated for mechanism 2.

The whole of FIGURE 1 functions as a driven switch-actuator system in response to the driving power delivered at imput path 93. The motor 92 is caused to stop and start in a variety of sequences dictated by the control signals present in the interruption and reversing of power applied to path 93. Only one of the mechanisms 1, 2, or 3 changes from one state of equilibrium to another at a time.

Particular attention is called to an important concept and a significant characteristic feature of my invention that, regardless of the direction of drive rotation, and regardless of the combination of mechanism states manifested at any time, the next change of state will be the lowest-numbered mechanism not already manifesting the state corresponding to the direction of drive. This control of the change of state whereby assuredly the lowest numbered unit not already manifesting the state corresponding to the nature of the correction signal 93 is the unit which is corrected can be conveniently designated as correcting the lowest correctably member of the series. Heretofore, some servo-mechanisms have tended to oscillate while searching for a suitable correction by reason of the lack of reliability of correcting the lowest correctable member of the series.

FIGURE 2 shows the essential features of the part of my invention which is particularly applicable to measuring systems involving mechanical forces. Lever arm 100 is welded or otherwise secured to torque tube 101 to comprise a T-shaped lever. Pivot supports 102 and 103 are welded or other wise secured to torque tube 101; and pivot support 128 is welded to lever arm 100. Flat springs 104 and 105 are clamped against their respective ends of support 102 by clamping bars 108 and 109 by the force applied when through bolts 112 are drawn home by tightening nuts 129 upon them; and flat springs 106 and 107 are clamped against their respective ends of support 103 by clamping bars 110 and 111 by the force applied when through bolts 113 are drawn home by the tightening of their nuts, not illustrated. Flats springs 104, 105, 106 and 107 are thus secured at their upper portions to comprise flexible extension in definite dimensional relationship with the lever assembly made up of torque tube 101 and lever arm 100. Suitable members secure the lower portions of the flat springs. Particular attention is directed to the fact that these four flexure members illustrate the fulcrums and pivots of my invention. Support bar 128 is provided to accept additional flexure pivot springs, secured by means of bolts through its holes. Lever arm, shown only in part in FIGURE 2, may be extended to provide additional space for other supports similar to 128; and additional supports similar to 102 can be secured to the torque tube 101 to permit the application of additional moments to the torque tube: these two elaborations beyond the simple lever illustrated are useful in some types of weighing scale lever systems.

It is of importance to note merely illustrative embodiments (and not limitation) are indicated by the bolts 112 and 113 in FIGURE 2. My invention is better applied to small levers by employing a single through bolt instead of each of pairs 112 and 113. Also, it is preferable to construct very heavy scales levers in accordance with my invention by using three of more through bolts in a cluster instead of each of the pairs 112 and 113.

Essential to my invention is the offset of axis of pivot support 128 from the axis of lever arm 100. Moreover, the axis of supports 102 and 103 must be offset from the axis of torque tube 101. The amount of this offset in linear measure multiplied by two approximately equals the vertical extent 130 of the flexing part of flat spring 105. The parts of spring 105 above and below the area determined by dimension 130 are clamped so that they cannot bend, and so that they provide the fastening surface for the spring. The other flat springs 104, 106, and 107 have like central areas which provide flexure and like end areas for clamping. It will be noted that the flexing areas of the flat springs exemplified by 105 extend equal vertical distances above and below the central horizontal plane of the lever 100, 101 and that the torque axis of torque tube 101 lies in that same horizontal plane, that is, the central horizontal plane of the lever 100, 101. Such offset not only permits simplified construction by means of relatively few parts fabricated by ordinary metal-working technique, but provides an essential operating feature by my invention whereby the horizontal center line through the center of any flexure area, for example area 130 of flexure spring 105, lies approximately in the same plane with the central plane of the lever 100, 101. This spatial relationship between the members in FIGURE 2 permits lever ratios to remain constant despite substantial angular movement of the lever about the torsion axis of torque tube 101.

The lower clamping portions of springs 104, 105, 106, and 107 are clamped to their respective angle brackets 114, 115, 116, and 117 by means of clamping bars 118, 119, 120, and 121; bolts 122, 123, and 124; and nuts 125, 126, 127. In normal operation a rigid bar, not illustrated, extends across the bottoms of angle brackets 115 and 117 and is rigidly bolted or welded to them so that the two springs 105 and 107 flex in unison and have the same axis of curvature at all times. Similarly, springs 104 and 106 normally operate as a pair by reason of being secured to another member, not shown.

Reference is now made to FIGURE 3 which discloses an embodiment of the measuring system of this invention in which a weight is measured. Certain aspects of the invention are clarified by this illustrative embodiment. The switch-actuator enclosed in outline 131 is the same switch actuator disclosed as the whole of FIGURE 1, and is mounted rigidly by structural members not shown to main support base 132. Dash pot housing 133, the lower end of spring 134, and angle bracket 117 are also securely attached to base 132, as illustrated in FIGURE 3. A bobbin and its supporting member, neither of which are shown in the figures, must be provided to support windings 136, 137, and 138 in rigid orientation with respect to each other and to base 132. The right-hand support for weigh frame 135 is not shown in the figures; but it is supported by fastening to angle 114 in FIGURE 2. The scale lever assembly in FIGURE 3 designated by reference numbers 100, 101, 103, 106, 107, 110, 111, 116, 117 121, and 128 is a partial schematic illustration of the same scale lever disclosed as the whole of FIGURE 2.

Cylindrical idler 139 is supported by its shaft, which extends at each end through a bearing in weigh frame 135. Conveyor belt 140 is pulled across idler 139 and other idlers, not shown, by a belt drive, not shown, in a manner familiar to those skilled in the art. Load 141, the weight of which is measured and read out digitally in accordance with the FIGURE 3 embodiment of the invention, may be a continous bulk stream of material in regular or irregular distribution along the belt, or it may be discrete individual pieces.

A source of electric power supply, an alternating voltage of commercially available kind, is supplied at input line pair 142; and the upper line of this pair is considered to be grounded for convenience of description and illustration. The system is equally operative on an ungrounded basis by removing the ground and considering the upper line of the pair 142 as a common return path. Double-pole, double-throw switch 143 is a mode selector. The system can be adjusted to function in the mode of continuously integrating and accumulating the weight of the load 141 as it passes over weighing idler 139 when set in the position illustrated; the system can be adjusted to function in the mode of individual weighings for separate loads in succession when the pole blades of switch 143 are switched to the position opposite to that illustrated. Readout push button 144, when pushed during the latter mode of operation, causes signals representing the weight 141 to be imposed upon lines 173 to 177 inclusive. Reset push button switch 145, whenever closed, imposes a signal upon line 178. Lines 149 are connected to a remote accumulator not illustrated and not part of the invention.

Servo amplifier 146 is connected in a manner not illustrated to power supply 142. It is a kind of amplifier, familiar to those skilled in the art, which provides power on output line 93 in a manner to start and stop the rotation of motor 92 in either direction. This output from amplifier 146 is regulated by the differential resultant of the summed signals imposed upon its input through resistors 191, 192, and 193.

Knobs 147 and 148 are secured to their respective threaded shafts 158 and 151, and are accessible for adjustment in rotation by hand. Collar 150 fastened to shaft 151 cooperates with the shoulder on knob 148 to restrict axial motion of shaft 151; and end plug 153 in lever arm 100 has a hole which acts as a bearing for the rotation of shaft 151. Poise weight 154 has a tapped hole through which the threaded portion of shaft 151 may rotate, so that the rotation of knob 148 gives a fine adjustment of the position of poise 154 axially along the inside of lever arm 100. Particular attention is called to the advantages attainable by this novel combination of the manually adjustable poise weight with the flexure pivot system, and differential transformer for precise measurement of fluctuations of weight near the weight manually adjusted by the poise weight. Even without any digital readout, the signal from the differential transformer can reliably and precisely weigh variations throughout a range such as five kilograms subsequent to the macroadjustment manually by the shifting of the poise weight. Previously available systems of flexure pivots and poise weights have lacked the reliability and ruggedness while still permitting adequate sensitivity and precision of any narrow range selected for electrical measurement.

A clearance hole 155 is provided in the bottom of lever arm 100 so that spring 134 does not at any time come into contact with lever arm 100. The upper end of spring 134 is formed into a hook and holds itself by its own tension in place in the notched boss on the upper side of expansion rod 156. The left-hand end of expansion rod 156 is firmly secured to the bottom surface of travelling nut 157; and the threaded portion of shaft 158 passing through nut 157 permits the axial adjustment of the expansion rod 156. Collar 159, secured to shaft 158, cooperates with the shoulder on knob 147 to restrict the axial motion of shaft 158 to the amount required for clearance so that shaft 158 can be rotated in its bearing holes in the side walls of torque tube 101.

Magnetic core 160 is fastened to the end of non-magnetic rod 161 so that any axial motion of the rod gives the same amount of axial motion to the core. Core 160 is so associated with windings 136, 137, and 138 and the bobbin upon which they are wound as to comprise a linear variable differential transformer, familiar to those skilled in the art. The lower end of non-magnetic rod 161 extends beneath the plane of tube 100. Such lower end of rod 161 is clamped to spacer 164 which moves in substantial correspondence with tube 100 through the urging of spring 162, the bottom of which is connected with spacer 164. The upper end of spring 162 is clamped to support 128, so that any angular motion of lever assembly 100, 101 causes a proportionate amount of linear motion of the magnetic core 160.

The top of flexure spring pivot 163 is clamped to support 128, and its lower end is clamped to dashpot piston 165, so that any rotary motion of lever assembly 100, 101 causes a proportionate amount of vertical motion of piston 165. Piston 165 and cylindrical housing 133 together constitute a dashpot, familiar to those skilled in the art. Housing 133 may be filled with viscous fluid to a level sufficient to cover the wide part of piston 165 if more pronounced damping is required than that provided when air is the damping fluid.

Rods 57 and 166 are rigidly attached at their lower ends to weights 167 and 168 respectively, and serve to lift or drop the weights under control of their respective mechanisms 3 and 171. The weights 167 and 168 are separately predetermined so that each applied its amount of torque to lever assembly 100, 101 when at rest in its respective notch in lever arm 100, and removes the same amount of torque when lifted out of its notch. Mechanisms 3 and 171 are included in the illustration of switch-actuator 131 to avoid excessive complexity of description, but those skilled in the art recognize that the plurality symbolizes a dozen or more such units required for typical use. The group of mechanism represented by mechanisms 3, 171, and 172 are equipped with rods and weights such as 57, 167, and 168. It is to be noted that mechanisms in the group 1, 169, 170 are not equippped with weights or lifting rods, but instead make electrical balances in response to the position of the lever, thus hybridizing a gravity and spring balancing on measuring the weight.

Leads 173 to 177, inclusive, are the signal paths over which are conducted pulses to the remote accumulator, a single pulse on each lead representing the measured value assigned to the mechanism in which it originated.

Resistor 179 is used to scale down the voltage due to the current flowing through it, said current being the sum of the currents flowing in the resistors in group 180 and 185, inclusive. Resistors 183, 184, and 185 are connected to switches not illustrated in a manner illustrated by the connection of resistor 180 to terminal 16. Resistor 191 provides a scale factor and signal path for the application of the voltage across resistor 179 as a summed component of the inputs to amplifier 146. Resistor 192 provides a suitable scale factor for the summed signal arriving at the input of amplifier 146 by way of the lower blade of switch 143. Resistor 193 provides a suitable scale factor for the summing at amplifier 146. Resistor 192 provides a suitable scale factor for the summed signal arriving at the input of amplifier 146 by way of the lower blade of switch 143. Resistor 193 provides a suitable scale factor for the summing at amplifier 146 of the signal arising from the windings 137 and 138, connected in series opposing.

Rotor 187 of switch 190 turns in synchronism with idler 139 of the system for the conveyor belt 140. Rotor 187 has secured rigidly to it, off center, magnet 188, so that magnet 188 passes close to pole piece 189 as it rotates. Pole piece 189 is so secured to the contact blades of double-pole switch 190 that the proximity of magnet 188 to pole piece 189 causes a closure of the contacts in switch 190 and holds them closed until rotor 187 rotates enough to release the armature 189 from the pull of magnet 188. Thus, movement of the conveyor belt 140 provides an intermittent signal for reading out the weight of the load on weigh frame 135.

Cup 194 is rigidly secured to the lever arm 100, and is used to hold hygroscopic material 195. In applications for weighing loads appearing at 141 which are hygroscopic, and so change weight indication as a function of the relative humidity of the ambient air, hygroscopic material 195 will manifest similar changes in weight, and so counterbalance weight changes of the load. This feature of my invention gives automatic correction to standard conditions of moisture content of the material being weighed.

In the previous description each reference item in FIGURES 1, 2, and 3 has been identified to clarify the association of each item with the other items. I will now describe operating features of the embodiment of my invention illustrated in FIGURE 3.

Forces due to the pull of gravity on load 141, belt 140, idler 139, and weigh frame 135 are transmitted through angle bracket 116 and flexure pivot 106 to cause a counterclockwise rotary displacement of lever 100, 101 about its fulcrum 107, and a corresponting amount of upward displacement of core 160. The result of this movement of core 160 is to increase the voltage across winding 137 and decrease the voltage across 138; and these two changes are added together in inverse relationship by reason of the series opposing connection of windings 137 and 138, so that their sum reaches the input of amplifier 146 through resistor 193. During the weighing interval the contacts of switch 190 are open so that no signal can be applied to amplifier 146 through resistor 192, so that the total input signal at amplifier 191 is the algebraic sum of the signals applied through resistors 193 and 191. Increase of the signal through resistor 193 immediately produces a drive signal in path 93 to motor 92 and turns rotor 70 in a direction to produce a closure of contacts 16 and 19. At the moment such closure occurs current will start flowing in resistor 180 and will pass through resistor 179; and the increased current flow in resistor 179 causes a proportionate increase in voltage across the resistor. This voltage, applied through resistor 191 as an input to amplifier 146, tends to balance the input through 193; and if the change of load at 141 is exactly the amount provided for in the value assigned to resistor 180, the amplifier output signal 93 will diminish to stop the motor 92 and allow mechanism to come to rest with resistor 180 connected to maintain its current flow in resistor 179 by way of contacts 16 and 19, which would remain closed. An essential feature of my invention is the arrangement of the parts of mechanism 1 so that as the contacts 16 and 19 close, the mercury globule 13 moves to the right and comes to rest in the right-hand end of envelope 4. globule 13 to a state of preparedness for transmission of a readout pulse. The readout pulse is produced by reason of the mode of operation initiated upon closure of switch 190, which connects ground to both of its contacts. One of these two ground signals reaches amplifier 146 through resistor 192, and is of high enough magnitude, by reason of relatively low value selected for resistor 192, that it overcomes the other two signals into amplifier and cause motor 92 to drive rotor 70 at full speed in the direction to open contacts 16 and 19.

At the same time the other ground signal from switch 190 is distributed, through the upper blade of mode switch 143, to terminal 7 of mercury switch 4. As the mercury globule moves across from right to left it momentarily contacts both of electrodes 7 and 10 at once, and so provides a momentary transmission of a ground pulse over lead 173 to the remote accumulator.

The duration of the closure of switch 190 is sufficient to allow the backlash between mechanisms 1 and 169 to be taken up, and for all of the successive mechanisms to be restored in succession to a zero position, corresponding to the open condition of the switch contacts associated with resistors 180 to 185, inclusive. This readout mode of operation provides an inherent means of scanning leads 173 to 177 in succession so as to originate a pulse on each of them if its mechanism had previously been positioned in suitable preparation, and to omit a readout pulse during the scan for each of them not prepared to originate a readout pulse. The overall performance is such that weighing occurs while switch 190 is open by reason of automatic balancing of the weight at 140 by balancing values selected from among resistors 180 to 185, inclusive, supplemented by weights dropped upon lever arm 100, selected automatically from among the group represented by weights 167 and 168.

The weighing and readout modes of operation occur in alternation with each other by reason of the alternate closing and opening of switch 190; and the synchronism between rotor 187 and idler 139 causes this closure and opening cycle to repeat once for each unit length of belt 140 passing over idler 139. This arrangement of the elements of my invention cause the amounts accumulated in the remote accumulator to accurately represent the total amount of weight passing idler 139 after the momentary operation of reset switch 145.

The automatic integration performance just described is disabled by throwing the switch blades of switch 143 to the position opposite to that illustrated in FIGURE 3, so that the alternate modes of weighing and readout must be selected manually under control of readout switch 144. When automatic integration is disabled, and readout switch positioned, as illustrated, automatic balancing and weighing will take place as previously described; but no readout of the balancing elements will occur. At any time the operator requires a readout of the weight present at 141, he may initiate it by pressing push-button switch 144 for a length of time sufficient for the motor 92 to drive all of the switches corresponding to 16, 19, to their open positions. The operator may clear this reading in readiness for the next weighing by momentarily pressing switch 145. In the conduct of such individual weighings and readout of weigh data, the operator may cause belt 140 to be stopped and place the items to be weighed at load location 141 by other means; or he may cause the belt to be driven at any desired speed so that items to be weighed will be carried by the belt in succession to weighing positions 141.

The innovation of the use of an expansion rod 156 to determine the distance of the top end of spring 134 from flexure pivot 107 accompanies the innovation of heavy springs as flexure pivots and fulcrums, because of the effect of changes in temperature upon the elastic properties of the spring materials. Material of which expansion rod 156 is fabricated is selected so that any change in ambient temperature will make a corresponding change in the distance of the upper end of spring 134 from fulcrum 107. The amount of such change compensates for the change in sensitivity caused by the effect of such ambient change in the spring constants of all of the pivots acting together. Changes in sensitivity due to other causes may be counteracted by manual adjustment at knob 147.

Poise 154 acts in the manner of the familiar screw-driven poise commonly used on scale beams. It is an advantage of my invention that this poise is part of the main scale lever assembly itself, and so does not require a separate balance beam.

Various mercury switch arrangements are possible without departure from the invention. Prior art descriptions include both the end closing type, in which the length and positioning of the electrodes permits the closing of the switch in a preselected sloping position, and the middle closing type, in which the length and positioning of the electrodes permits the switch to be open in the two alternative sloping positions, but to close momentarily to send a pulse during the shifting between such two alternative sloping positions. If the remote display device is dependent upon a series of pulse signals, then the middle closing type mercury switches will be employed, but otherwise the end closing type of mercury switch would be used. Substitution of the correct type of mercury switch to comply with the needs of the remote display device can be made without departing from the invention. In an effort to illustrate both types and the ease of substitution thereof, mechanism 3 of FIG. 1 shows an end-closing type of mercury switch and mechanisms 131 and 171 of FIG. 3 show the middle closing type of mercury switch. The term "mercury switch" embraces all switches utilizing a pool of liquid conductor flowable from opposite ends of a tiltable container.

Various modifications of the invention are possible without departing from the several inventive concepts herein disclosed and set forth in the appended claim.

The invention claimed is:

A measuring system comprising: an amplifier actuated in part by an electrical signal indicative of the direction and amount of deflection of a lever from its normal position, said lever being deflectable by the quantity being measured; a servomotor driven by the output from the amplifier; a plurality of bistable mechanisms, each bistable mechanism being shifted either to advanced position or to a withdrawn position in accordance with the direction of the most recent complete revolution of a rotor associated with such bistable mechanism; a plurality of rotors, each rotor being associated with its bistable mechanism; a finger on each rotor; a U shaped spring having two spring tips extending from a slot in a bistable mechanism; positioning means associating the finger of a rotor and the spring tips so that the orientation of the bistable mechanism is controlled by the most recent complete rotation of the rotor and so that the spring tip yieldingly permits continued rotation of the rotor in the direction corresponding to the established orientation of the bistable mechanism; a pair of pivoted members in each bistable mechanism; a spring urging said pivoted members to each of the advanced and withdrawn positions but yieldingly permitting the shifting therebetween when actuated by the engagement of the finger with the slot in which the U shaped spring is positioned; a series drive connection among the plurality of rotors, whereby rotation of the servomotor in a particular direction initially rotates the first rotor in said direction, and then, after a selected amount of takeup of backlash, rotates successive rotors in the series until a stopping or reversing signal is transmitted to the servomotor; and means associated with each bistable unit to apply a balancing force while in the advanced position, the servomotor being responsive to such balancing forces so that the servomotor rests motionless after selecting the precise combination of bistable mechanisms oriented in the advanced position.

No references cited.

JOHN F. COUCH, *Primary Examiner.*